US008599129B2

(12) United States Patent
Miyamoto

(10) Patent No.: US 8,599,129 B2
(45) Date of Patent: Dec. 3, 2013

(54) METHOD FOR OPERATING ELECTROPHORETIC DISPLAY APPARATUS, ELECTROPHORETIC DISPLAY APPARATUS, AND ELECTRONIC SYSTEM

(75) Inventor: Tsutomu Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 620 days.

(21) Appl. No.: 12/716,619

(22) Filed: Mar. 3, 2010

(65) Prior Publication Data

US 2010/0231488 A1 Sep. 16, 2010

(30) Foreign Application Priority Data

Mar. 13, 2009 (JP) ................................ 2009-061178

(51) Int. Cl.
*G09G 3/34* (2006.01)
*G09G 3/36* (2006.01)
*G06F 3/038* (2013.01)
*G09G 5/00* (2006.01)

(52) U.S. Cl.
USPC .............................. 345/107; 345/94; 345/204

(58) Field of Classification Search
USPC ........................................................ 345/107
See application file for complete search history.

(56) References Cited

U.S. PATENT DOCUMENTS 7,259,745 B2 * 8/2007 Hamaguchi .................. 345/107
2003/0067666 A1 4/2003 Kawai
2005/0016456 A1 * 1/2005 Taguchi et al. ........... 118/723 E
2005/0111075 A1 * 5/2005 Kaneko et al. ................ 359/296
2008/0204435 A1 8/2008 Miyamoto
2008/0238867 A1 * 10/2008 Maeda et al. ................. 345/107
2009/0146991 A1 * 6/2009 Shimodaira et al. .......... 345/214
2009/0213047 A1 * 8/2009 Abe et al. ........................ 345/76

FOREIGN PATENT DOCUMENTS

JP 2003-140199 A 5/2003
JP 2004-94168 A 3/2004
JP 2008-70546 A 3/2008

* cited by examiner

*Primary Examiner* — Alexander S Beck
*Assistant Examiner* — Nguyen H Truong
(74) *Attorney, Agent, or Firm* — ALG Intellectual Property, LLC

(57) ABSTRACT

There is provided a method for operating an electrophoretic display apparatus including a first substrate; a second substrate; an electrophoretic device being held between the first substrate and the second substrate and containing electrophoretic particles; a first electrode formed on a surface of the first substrate, the surface facing the electrophoretic device; an insulation layer formed between the first electrode and the electrophoretic device; and a second electrode formed on a surface of the second substrate, the surface facing the electrophoretic device. The method includes: (a) driving the electrophoretic device by inputting a first potential to the first electrode and inputting a second potential to the second electrode, and (b) recovering a potential of the second electrode by changing the potential of the second electrode, from the second potential to the first potential, at a constant rate such that a voltage applied to the electrophoretic device is made equal to or smaller than a threshold voltage of the electrophoretic device, wherein (b) is performed after (a) and before next (a).

13 Claims, 10 Drawing Sheets

METHOD FOR OPERATING ELECTROPHORETIC DISPLAY APPARATUS, ELECTROPHORETIC DISPLAY APPARATUS, AND ELECTRONIC SYSTEM

BACKGROUND

1. Technical Field

The present invention relates to a method for operating an electrophoretic display apparatus, an electrophoretic display apparatus, and an electronic system.

2. Related Art

There is an electrophoretic display apparatus having a configuration in which an electrophoretic device containing a liquid-phase dispersion medium and electrophoretic particles is held between a pair of substrates. Such an electrophoretic display apparatus is configured to display an image by applying a voltage to a pair of electrodes between which the electrophoretic device is held to thereby change the distribution of electrophoretic particles (for example, see JP-A-2003-140199).

JP-A-2003-140199 describes a method for operating an electrophoretic display apparatus having a configuration in which an insulation member is provided on a surface of an electrode. To suppress self-erasing of an electrophoretic device in this configuration, JP-A-2003-140199 states that changing a waveform from having a sharp drop to having a gradual decrease upon stoppage of voltage application to electrodes prevents a voltage with a reversed polarity from being applied to the electrophoretic device.

SUMMARY

According to the operation method described in JP-A-2003-140199, upon operation of an electrophoretic device, application of a reverse voltage to the electrodes can be prevented and self-erasing upon image writing can be prevented. However, the inventor of the present invention has performed studies and found that, when an electrophoretic display apparatus including a plurality of pixel electrodes formed on a substrate and a common electrode formed on the other substrate is operated by changing the potential of the common electrode on a frame-by-frame basis, self-erasing can occur even after an image has been written to the electrophoretic device.

An advantage of some aspects of the invention is that a method for operating an electrophoretic display apparatus with which self-erasing can be suppressed even after writing to the electrophoretic device has been performed is provided. Another advantage of some aspects of the invention is that an electrophoretic display apparatus having an excellent image retention characteristic is provided.

According to a first aspect of the invention, provided is a method for operating an electrophoretic display apparatus including a first substrate; a second substrate; an electrophoretic device being held between the first substrate and the second substrate and containing electrophoretic particles; a first electrode formed on a surface of the first substrate, the surface facing the electrophoretic device; an insulation layer formed between the first electrode and the electrophoretic device; and a second electrode formed on a surface of the second substrate, the surface facing the electrophoretic device. The method includes: (a) driving the electrophoretic device by inputting a first potential to the first electrode and inputting a second potential to the second electrode, and (b) recovering a potential of the second electrode by changing the potential of the second electrode, from the second potential to the first potential, at a constant rate such that a voltage applied to the electrophoretic device is made equal to or smaller than a threshold voltage of the electrophoretic device, wherein (b) is performed after (a) and before next (a).

According to this operation method, in (b), the potential of the second electrode is changed, from the second potential to the first potential, at a predetermined constant rate while a voltage applied to the electrophoretic device is maintained to be equal to or smaller than the threshold voltage of the electrophoretic device. Thus, current flowing through the insulation layer upon stoppage of application of the voltage to the second electrode can be suppressed and application of a voltage, to the electrophoretic device, having a polarity opposite to the polarity of the voltage applied in (a) can be suppressed. As a result, a method for operating an electrophoretic display apparatus with which self-erasing can be suppressed even after writing of an image to the electrophoretic device has been performed can be provided. Herein, the threshold voltage of the electrophoretic device is the maximum voltage applied to the electrophoretic device in a range of voltage within which electrophoretic particles do not move and the contrast of the electrophoretic device is maintained. Accordingly, when a voltage exceeding the threshold voltage is applied to the electrophoretic device, electrophoretic particles move and the contrast of the electrophoretic device is changed.

In (b), the rate at which the potential of the second electrode is changed is preferably set to a maximum value of a range within which the voltage applied to the electrophoretic device is made equal to or smaller than the threshold voltage of the electrophoretic device.

In this case, degradation of the contrast caused by self-erasing can be suppressed while the potential of the first electrode after image displaying has been performed can be stabilized in a short period of time.

The electrophoretic device may include a capsule containing the electrophoretic particles and an electrophoretic dispersion solution, and the insulation layer may include a wall membrane of the capsule. That is, the insulation layer may include not only an insulation-material layer provided between the first electrode and the electrophoretic device but also the wall membrane of the capsule containing the electrophoretic particles. Stated another way, a method for operating an electrophoretic display apparatus according to the first aspect is also suitably applicable to an electrophoretic display apparatus in which the electrophoretic device includes the capsule and an insulation film and an adhesive agent are not provided between the first electrode and the electrophoretic device.

The insulation layer may further include an adhesive layer provided between the first electrode and the electrophoretic device. That is, a method according to the first aspect is also suitably applicable to an electrophoretic display apparatus in which the electrophoretic device and the first electrode are bonded to each other with the adhesive layer therebetween.

According to a second aspect of the invention, provided is a method for operating an electrophoretic display apparatus including a first substrate; a second substrate; an electrophoretic device being held between the first substrate and the second substrate and containing electrophoretic particles; a plurality of first electrodes formed on a surface of the first substrate, the surface facing the electrophoretic device; an insulation layer formed between the plurality of first electrodes and the electrophoretic device; and a second electrode formed on a surface of the second substrate so as to face the plurality of first electrodes, the surface facing the electrophoretic device. The method includes: driving a portion of the electrophoretic device between the at least one of the first electrodes and the second electrode by inputting a first potential to at least one of the first electrodes and inputting a voltage alternating between the first potential and a second potential, to the second electrode, a waveform of the voltage having trapezoidal shape, wherein a potential of the second electrode is changed, from the first potential to the second potential, at a constant rate such that a voltage applied to the electrophoretic device is made equal to or smaller than a threshold voltage of the electrophoretic device.

According to this operation method, upon image displaying, when the potential of the second electrode is changed from the first potential to the second potential, the voltage applied to the electrophoretic device can be maintained to be equal to or smaller than the threshold voltage of the electrophoretic device. Thus, application of a voltage, to a non-driven portion of the electrophoretic device, having a polarity opposite to the polarity of the voltage applied during driving the electrophoretic device can be suppressed. As a result, a method for operating an electrophoretic display apparatus in which self-erasing in a non-driven portion of the electrophoretic device can be suppressed while an image is written can be provided.

The electrophoretic device may include a capsule containing the electrophoretic particles and an electrophoretic dispersion solution, and the insulation layer may include a wall membrane of the capsule. That is, the insulation layer may include not only an insulation-material layer provided between the first electrode and the electrophoretic device but also the wall membrane of the capsule containing the electrophoretic particles. Stated another way, a method for operating an electrophoretic display apparatus according to the first aspect is also suitably applicable to an electrophoretic display apparatus in which the electrophoretic device includes the capsule and an insulation film and an adhesive agent are not provided between the first electrode and the electrophoretic device.

The insulation layer may further include an adhesive layer provided between the first electrode and the electrophoretic device. That is, a method according to the first aspect is also suitably applicable to an electrophoretic display apparatus in which the electrophoretic device and the first electrode are bonded to each other with the adhesive layer therebetween.

According to a third aspect of the invention, an electrophoretic display apparatus is provided that includes: a first substrate; a second substrate; an electrophoretic device disposed between the first substrate and the second substrate and containing electrophoretic particles; a first electrode disposed on a surface of the first substrate, the surface facing the electrophoretic device; an insulation layer disposed between the first electrode and the electrophoretic device; a second electrode disposed on a surface of the second substrate, the surface facing the electrophoretic device; and a voltage control section that applies a driving voltage to the electrophoretic device. In driving the electrophoretic device to display images, the voltage control section is configured to drive the electrophoretic device by inputting a first potential to the first electrode and inputting a second potential to the second electrode; and, before a next image is displayed, the voltage control section is configured to perform a potential recovering operation in which a potential of the second electrode is changed, from the second potential to the first potential, at a constant rate such that a voltage applied to the electrophoretic device is made equal to or smaller than a threshold voltage of the electrophoretic device.

In an electrophoretic display apparatus having this configuration, in the potential recovering operation, the potential of the second electrode is changed, from the second potential to the first potential, at a predetermined constant rate while a voltage applied to the electrophoretic device is maintained to be equal to or smaller than the threshold voltage of the electrophoretic device. Thus, current flowing through the insulation layer upon stoppage of application of the voltage to the second electrode can be suppressed and application of a voltage, to the electrophoretic device, having a polarity opposite to the polarity of the voltage applied during driving the electrophoretic device can be suppressed. As a result, an electrophoretic display apparatus in which self-erasing can be suppressed even after writing of an image to the electrophoretic device has been performed and an image retention characteristic is excellent can be provided.

According to a fourth aspect of the invention, an electrophoretic display apparatus is provided that includes: a first substrate; a second substrate; an electrophoretic device disposed between the first substrate and the second substrate and containing electrophoretic particles; a first electrodes disposed on a surface of the first substrate, the surface facing the electrophoretic device; an insulation layer disposed between the first electrode and the electrophoretic device; a second electrode disposed on a surface of the second substrate, the surface facing the electrophoretic device; and a voltage control section that applies a driving voltage to the electrophoretic device. In driving the electrophoretic device to display an image, the voltage control section is configured to drive the electrophoretic device by inputting a first potential to the first electrodes and inputting a voltage alternating between the first potential and a second potential, to the second electrode, a waveform of the voltage having trapezoidal shape; and the voltage control section is configured to change a potential of the second electrode, from the first potential to the second potential, at a constant rate such that a voltage applied to the electrophoretic device is made equal to or smaller than a threshold voltage of the electrophoretic device.

In an electrophoretic display apparatus having this configuration, upon image displaying, when the potential of the second electrode is changed from the first potential to the second potential, the voltage applied to the electrophoretic device can be maintained to be equal to or smaller than the threshold voltage of the electrophoretic device. Thus, application of a voltage, to a non-driven portion of the electrophoretic device, having a polarity opposite to the polarity of the voltage applied during driving the electrophoretic device can be suppressed. As a result, an electrophoretic display apparatus in which, upon image writing, self-erasing can be suppressed in a non-driven portion of the electrophoretic device can be provided.

The electrophoretic device may include a capsule containing the electrophoretic particles and an electrophoretic dispersion solution, and the insulation layer may include a wall membrane of the capsule.

That is, the insulation layer may include not only an insulation-material layer provided between the first electrode and the electrophoretic device but also the wall membrane of the capsule containing the electrophoretic particles. Stated another way, an electrophoretic display apparatus according to the third aspect may be an electrophoretic display apparatus in which the electrophoretic device includes the capsule and an insulation film and an adhesive agent are not provided between the first electrode and the electrophoretic device.

The insulation layer may include an adhesive layer provided between the first electrode and the electrophoretic device. That is, an electrophoretic display apparatus according to the third aspect may have a configuration in which the electrophoretic device and the first electrode are bonded to each other with the adhesive layer therebetween.

An electronic system according to a fifth aspect of the invention includes any one of the above-described electrophoretic display apparatuses.

According to this aspect, an electronic system can be provided that includes a display unit having an excellent image retention characteristic and an excellent displaying quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
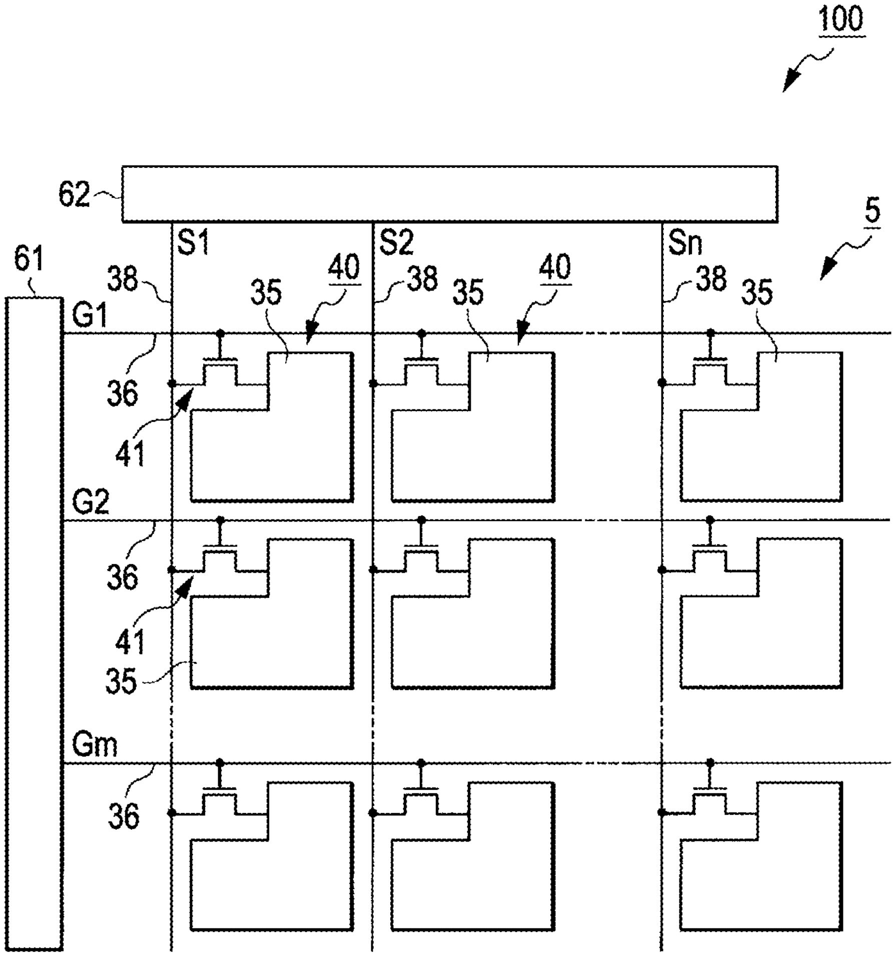
FIG. 1 is a schematic view of the configuration of an electrophoretic display apparatus 100 according to an embodiment.

Hereinafter, electrophoretic display apparatuses according to embodiments of the invention are described with reference to the drawings. Note that these embodiments are directed to electrophoretic display apparatuses driven by the active matrix system.

These embodiments are mere examples of the invention and they are not intended to restrict the invention. Various changes can be freely made in these embodiments without departing from the spirit and scope of the invention. The drawings have been made more readily understandable and the configurations shown in the drawings do not necessarily represent actual configurations.

First Embodiment

FIG. 1 is a schematic view of the configuration of an electrophoretic display apparatus 100 according to a first embodiment of the invention.

The electrophoretic display apparatus 100 includes a display section 5 in which a plurality of pixels 40 is arranged in a matrix. Provided in a region surrounding the display section 5 are a scanning line driving circuit 61 and a data line driving circuit 62. The display section 5 includes a plurality of scanning lines 36 extending from the scanning line driving circuit 61 and a plurality of data lines 38 extending from the data line driving circuit 62. The pixels 40 are provided so as to correspond to the intersections of the scanning lines 36 and the data lines 38. Each pixel 40 includes a selection transistor 41 connected to one of the scanning lines 36 and one of the data lines 38, and a pixel electrode 35 (first electrode) connected to the selection transistor 41.

The scanning line driving circuit 61 is connected to the pixels 40 via 1 to m scanning lines 36 (G1, G2, . . . , Gm). The scanning line driving circuit 61 sequentially selects these 1 to m scanning lines 36 and feeds selection signals to the pixels 40 via a scanning line 36 being selected, the selection signals defining the on-timing of the selection transistors 41 provided in the pixels 40.

The data line driving circuit 62 is connected to the pixels 40 via 1 to n data lines 38 (S1, S2, . . . , Sn). The data line driving circuit 62 feeds image signals defining pixel data to each pixel 40.

Figure 2A:
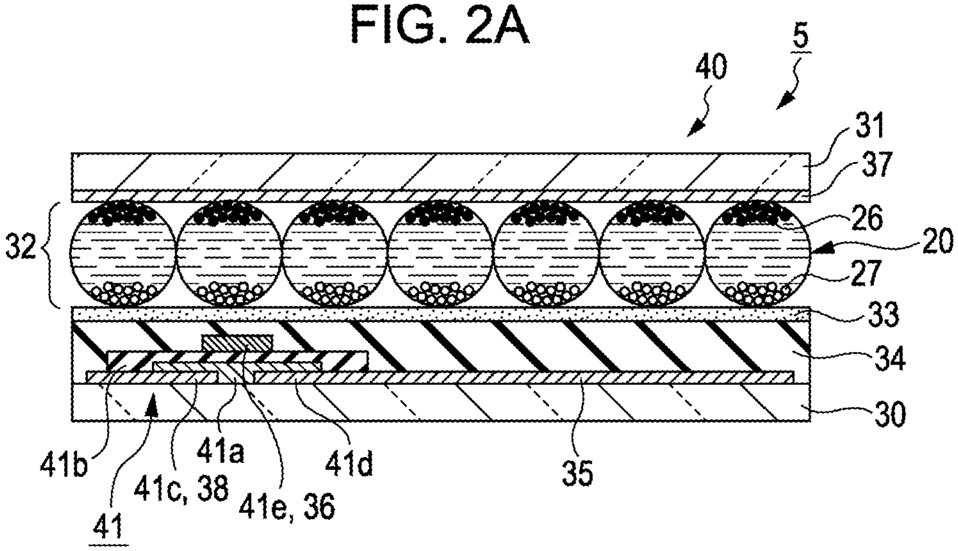
FIG. 2A is a fragmentary sectional view of an electrophoretic display apparatus, the sectional view showing a portion corresponding to a pixel.

FIG. 2A is a fragmentary sectional view of the electrophoretic display apparatus 100, the sectional view showing a portion corresponding to one of the pixels 40 provided in the display section 5. The electrophoretic display apparatus 100 includes a device substrate (first substrate) 30, a counter substrate (second substrate) 31, and an electrophoretic device 32 including a plurality of microcapsules 20 being arranged, the electrophoretic device 32 being held between the device substrate 30 and the counter substrate 31.

In the display section 5, the selection transistor 41, the pixel electrode 35 (first electrode) connected to the selection transistor 41, the scanning line 36, and the data line 38 are formed on a surface of the device substrate 30, the surface facing the electrophoretic device 32. An insulation film 34 is formed so as to cover the selection transistor 41, the scanning line 36, the data line 38, and the pixel electrode 35.

The device substrate 30 is formed of glass, plastic, or the like. Since the device substrate 30 is disposed on a side opposite an image display surface, the device substrate 30 is not necessarily transparent. In particular, the first embodiment employs organic transistors described below as the selection transistors 41 and hence a plastic substrate that is inexpensive, light weight, and flexible can be used as the device substrate 30.

The pixel electrodes 35 are configured to apply a driving voltage to the electrophoretic device 32. Each pixel electrode 35 may have a configuration obtained by sequentially plating a nickel layer and a gold layer on a Cu (copper) foil. Alternatively, the pixel electrode 35 may be formed of Al, ITO (indium tin oxide), or the like. Alternatively, the pixel electrode 35 may be formed of, for example, Cr, Ta, Mo, Nb, Ag, Pt, Pd, In, Nd, or an alloy of the foregoing; a conductive oxide such as $InO_2$ or $SnO_2$; a conductive polymer such as polyaniline, polypyrrole, polythiophene, or polyacetylene; a conductive polymer mixed with a dopant, for example, an acid such as hydrochloric acid, sulfuric acid, or sulfonic acid, an Lewis acid such as $PF_6$, $AsF_5$, or $FeCl_3$, atoms of a halogen such as iodine, or atoms of a metal such as sodium or potassium; or a conductive composite material containing carbon black or metal particles being dispersed.

The scanning lines 36 and the data lines 38 may be formed of a material or materials among the above-described materials for the pixel electrodes 35.

Each selection transistor 41 includes a semiconductor layer 41*a*, a gate insulation film 41*b*, a source electrode 41*c*, a drain electrode 41*d*, and a gate electrode 41*e*. In the first embodiment, the source electrode 41*c* is constituted by a portion of the data line 38, the drain electrode 41*d* is constituted by a portion of the pixel electrode 35, and the gate electrode 41*e* is constituted by a portion of the scanning line 36.

The semiconductor layer 41*a* is an organic semiconductor layer containing an organic semiconductor material. The semiconductor layer 41*a* is formed on the device substrate 30 with portions of the semiconductor layer 41_a_ being formed on the source electrode 41_c_ and the drain electrode 41_d_.

An example of such an organic semiconductor material is a polymeric organic semiconductor material such as poly(3-alkylthiophene), poly(3-hexylthiophene) (P3HT), poly(3-octylthiophene), poly(2,5-thienylenevinylene) (PTV), poly (para-phenylenevinylene) (PPV), poly(9,9-dioctylfluorene) (PFO), poly(9,9-dioctylfluorene-co-bis-N,N'-(4-methoxyphenyl)-bis-N,N'-phenyl-1,4-phenylenediamine) (PFMO), poly(9,9-dioctylfluorene-co-benzothiadiazole) (BT), a fluorene-triallylamine copolymer, a triallylamine-based polymer, or a fluorene-bithiophene copolymer (e.g. poly(9,9-dioctylfluorene-co-dithiophene) (F8T2)); $C_{60}$, a metal phthalocyanine complex, or a substituted derivative of the foregoing; an acene molecular material such as anthracene, tetracene, pentacene, or hexacene; or $\alpha$-oligothiophenes, specifically, a low-molecular-weight organic semiconductor such as quarterthiophene (4T), sexithiophene (6T), or octathiophene. These examples may be used alone or in combination as a mixture.

Non-limiting examples of a method for forming an organic semiconductor film include vacuum deposition, molecular beam epitaxy, CVD, sputtering, plasma polymerization, electrolytic polymerization, chemical polymerization, ion plating, spin coating, casting, immersion coating, Langmuir-Blodgett method, spraying, ink jet method, roll coating, bar coating, dispensing, silk screening, dip coating, and the like. For example, a mask having openings for providing a desired pattern is aligned with the device substrate 30 and then an organic semiconductor film may be formed through the mask by one of the above-described methods. Alternatively, a uniformly formed organic semiconductor layer may be partially etched to thereby form a semiconductor layer having different thicknesses among regions. Among the methods described above, preferred are methods in which a semiconductor layer is formed by coating a material solution by ink jet method or dispensing because the thickness of the resultant layer can be most easily controlled.

The gate insulation film 41_b_ is selectively formed in a flat region covering the semiconductor layer 41_a_. A material used for forming the gate insulation film 41_b_ is not particularly restricted as long as the material has an insulation property. Such an insulation material may be an organic material or an inorganic material. However, an organic insulation material is preferably used because, in general, use of an organic insulation material readily provides a good interface between the resultant organic insulation film and an organic semiconductor layer. The gate insulation film 41_b_ that generally has good electric characteristics is formed of a material such as polyvinyl alcohol, polyethylene, polypropylene, polybutylene, polystyrene, polymethyl methacrylate, polyimide, polyvinyl phenol, polycarbonate, or para-xylylene. These materials may be used alone or in combination.

The gate electrode 41_e_ is formed at a position facing the channel region of the semiconductor layer 41_a_ with the gate insulation film 41_b_ therebetween. The channel region is a region sandwiched by the source electrode 41_c_ and the drain electrode 41_d_. The gate electrode 41_e_ (scanning line 36) can be formed by etching a conductive film formed of one of the above-described materials. Alternatively, the gate electrode 41_e_ may be formed by conducting vapor deposition of a conductive film onto the device substrate 30 through a metal through mask having openings for providing a desired pattern. Alternatively, the gate electrode 41_e_ may be formed by selectively coating a solution containing conductive particles such as metal fine particles or graphite particles by ink jet method or the like.

The insulation film 34 may be, for example, an inorganic insulation film composed of silicon oxide, silicon nitride, or the like or an organic insulation film composed of an acrylic resin, an epoxy resin, or the like. Formation of the insulation film 34 flattens irregularities on the device substrate 30, the irregularities being caused by the selection transistors 41 and the pixel electrodes 35. Formation of the insulation film 34 also results in an increase in the distance between the selection transistors 41 and the electrophoretic device 32, which suppresses that an electric field generated during driving of the selection transistors 41 influences the electrophoretic device 32.

A common electrode 37 (second electrode) being flat is formed on a surface of the counter substrate 31, the surface facing the electrophoretic device 32, so as to face the plurality of the pixel electrodes 35. The electrophoretic device 32 is provided on the common electrode 37.

The counter substrate 31 is formed of glass, plastic, or the like. The counter substrate 31, which is disposed on an image display surface side, is transparent. The common electrode 37 together with the pixel electrodes 35 apply a voltage to the electrophoretic device 32. The common electrode 37 is a transparent electrode formed of MgAg (magnesium silver), ITO (indium tin oxide), IZO (indium zinc oxide), or the like.

In the first embodiment, the electrophoretic device 32 is formed, on the counter substrate 31 side, as an electrophoretic sheet including an adhesive layer 33 used for bonding to the device substrate 30. The adhesive layer 33 of the electrophoretic sheet and the insulation film 34 on the device substrate 30 are then bonded to each other. Thus, the electrophoretic display apparatus 100 is produced.

The adhesive layer 33 may fill the gaps among the microcapsules 20 or may be provided as an adhesive-agent layer covering the electrophoretic device 32 formed on the counter substrate 31.

Figure 2B:
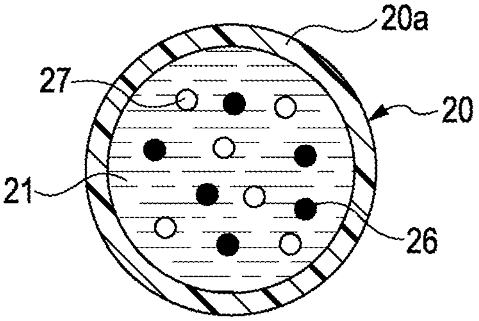
FIG. 2B is a sectional view of a microcapsule.

FIG. 2B is a schematic sectional view of one of the microcapsules 20. Each microcapsule 20 has a spherical shape having a diameter of, for example, about 50 $\mu$m. Each microcapsule 20 has a configuration in which a dispersion medium 21, a plurality of white particles (electrophoretic particles) 27, and a plurality of black particles (electrophoretic particles) 26 are contained in a spherical wall membrane 20_a_ (shell). Referring to FIG. 2A, the microcapsules 20 are held between the common electrode 37 and the pixel electrodes 35 such that one or more microcapsules 20 correspond to each pixel 40.

The wall membranes 20_a_ of the microcapsules 20 are formed of, for example, a polymeric resin having a sufficiently high light transmittance such as an acrylic resin such as polymethyl methacrylate or polyethyl methacrylate, a urea resin, or gum arabic.

The dispersion medium 21 is liquid for dispersing the white particles 27 and the black particles 26 in the microcapsules 20. Non-limiting examples of the dispersion medium 21 include water, alcohol-based solvents (methanol, ethanol, isopropanol, butanol, octanol, methyl cellosolve, or the like), esters (ethyl acetate, butyl acetate, or the like), ketones (acetone, methyl ethyl ketone, methyl isobutyl ketone, or the like), aliphatic hydrocarbons (pentane, hexane, octane, or the like), alicyclic hydrocarbons (cyclohexane, methylcyclohexane, or the like), aromatic hydrocarbons (benzene, toluene, benzenes including a long alkyl chain such as xylene, hexylbenzene, heptylbenzene, octylbenzene, nonylbenzene, decylbenzene, undecylbenzene, dodecylbenzene, tridecylbenzene, tetradecylbenzene, or the like), halogenated hydrocarbons (methylene chloride, chloroform, carbon tetrachloride, 1,2-dichloroethane, or the like), carboxylates, and the like. Alternatively, another oil may be used as the dispersion medium 21. These listed compounds may be used alone or in combination as a mixture. These listed compounds may be mixed with a surfactant or the like.

The white particles 27 are particles (a high polymer or colloid) formed of a white pigment such as titanium dioxide, hydrozincite, or antimony trioxide. The white particles 27 are charged, for example, negatively. The black particles 26 are particles (a high polymer or colloid) formed of a black pigment such as aniline black or carbon black. The black particles 26 are charged, for example, positively.

When necessary, such a pigment may be mixed with a charge control agent including particles of an electrolyte, a surfactant, metal soap, a resin, rubber, oil, varnish, a compound, or the like; a dispersing agent such as a titanium-based coupling agent, an aluminum-based coupling agent, or a silane-based coupling agent; a lubricant; a stabilizing agent; or the like.

Alternatively, instead of the black particles 26 and the white particles 27, for example, a red pigment, a green pigment, a blue pigment, or the like may also be used. When a red pigment, a green pigment, a blue pigment, or the like is used, red, green, blue, or the like can be respectively shown in the display section 5.

As described above, the electrophoretic display apparatus 100 includes the insulation film 34 and the adhesive layer 33 that are formed of insulation materials between the pixel electrodes 35 and the electrophoretic device 32. The wall membranes 20*a* of the microcapsules 20 constituting the electrophoretic device 32 are also formed of an insulation material. Accordingly, in the first embodiment, the insulation film 34, the adhesive layer 33, and the wall membranes 20*a* of the microcapsules 20 constitute an insulation layer INS (see FIGS. 4A and 4B) according to the invention.

In the first embodiment, the insulation film 34 is formed so as to cover the pixel electrodes 35. Alternatively, the pixel electrodes 35 may be exposed through openings formed in regions of the insulation film 34, the regions corresponding to the pixel electrodes 35. Alternatively, the pixel electrodes 35 may be formed on the insulation film 34 and the pixel electrodes 35 and the drain electrodes 41*d* may be connected to each other through contact holes formed so as to extend through the insulation film 34 to the drain electrodes 41*d*. In these cases, the insulation layer INS according to the invention is constituted by the adhesive layer 33 and the wall membranes 20*a* of the microcapsules 20.

Alternatively, the device substrate 30 and the counter substrate 31 may be combined together by another method without forming the adhesive layer 33. In this case, the insulation layer INS according to the invention is constituted only by the wall membranes 20*a* of the microcapsules 20.

Figure 3A:
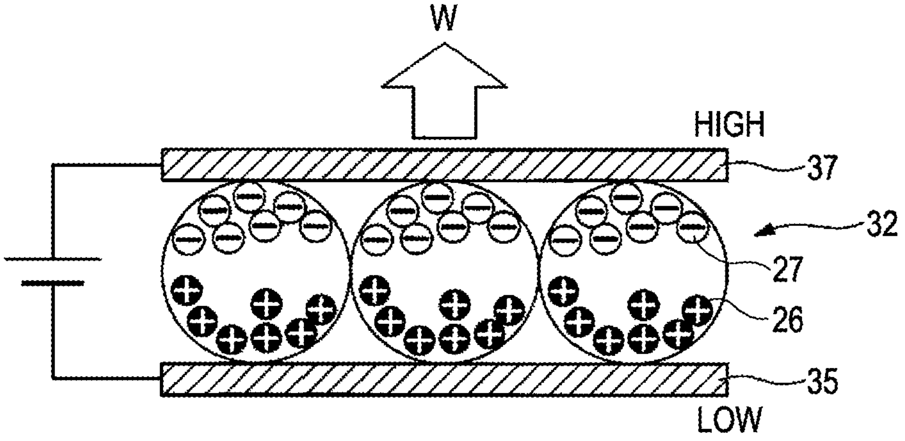
FIGS. 3A and 3B are explanatory views for operations of electrophoretic devices.
Figure 3B:
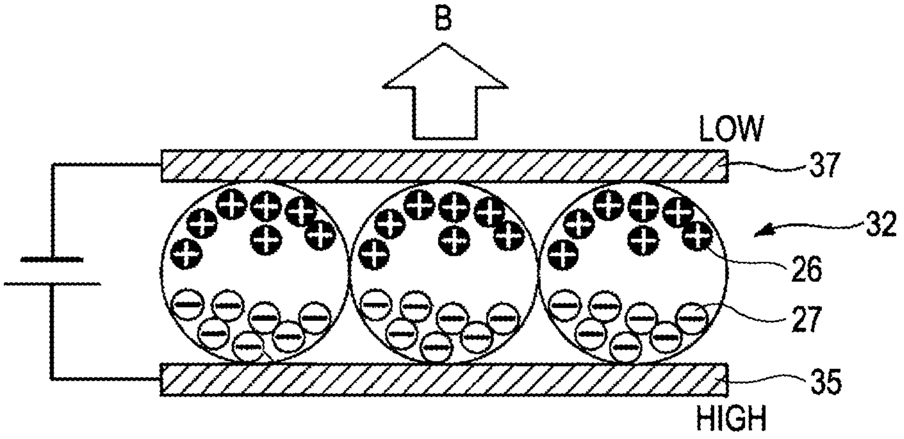

FIGS. 3A and 3B are explanatory views showing operations of the electrophoretic device 32. FIG. 3A corresponds to the case where the pixel 40 displays white. FIG. 3B corresponds to the case where the pixel 40 displays black.

Referring to FIG. 3A, where the pixel 40 displays white, the common electrode 37 is maintained at a relatively high potential while the pixel electrode 35 is maintained at a relatively low potential. In this state, the negatively charged white particles 27 are attracted toward the common electrode 37 while the positively charged black particles 26 are attracted toward the pixel electrode 35. As a result, the pixel 40 displays white (W) when viewed from the common electrode 37 side, which is the display surface side.

Referring to FIG. 3B, where the pixel 40 displays black, the common electrode 37 is maintained at a relatively low potential while the pixel electrode 35 is maintained at a relatively high potential. In this state, the positively charged black particles 26 are attracted toward the common electrode 37 while the negatively charged white particles 27 are attracted toward the pixel electrode 35. As a result, the pixel 40 displays black (B) when viewed from the common electrode 37 side.

Hereinafter, a method for operating the electrophoretic display apparatus 100 having the above-described configuration will be described with reference to FIGS. 4A to 6B.

Figure 4A:
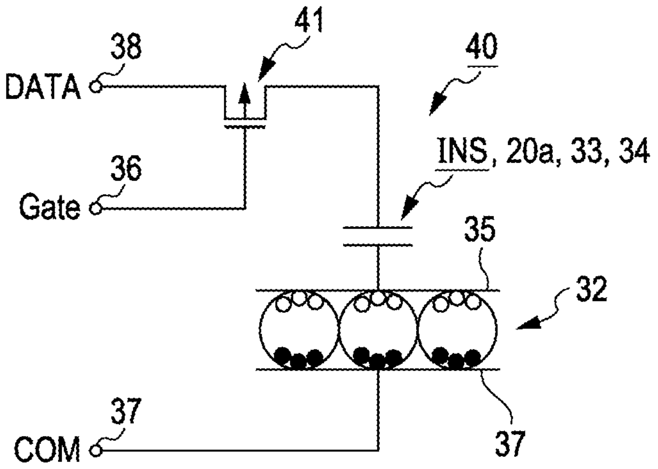
FIGS. 4A and 4B show circuit configurations of a pixel.
Figure 4B:
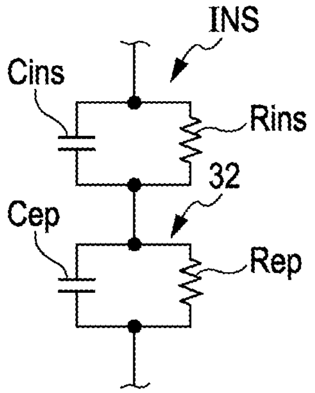
Figure 5:
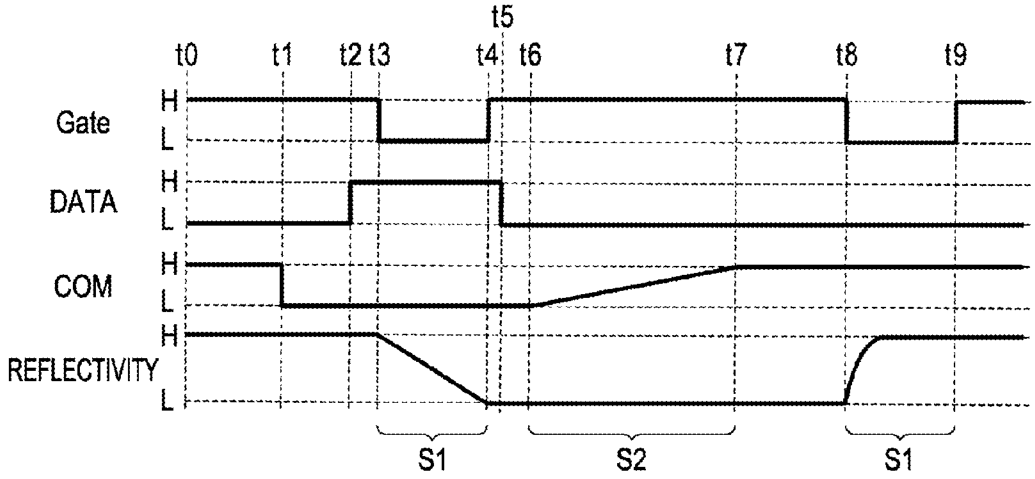
FIG. 5 is a timing chart showing an operation method according to a first embodiment.
Figure 6A:
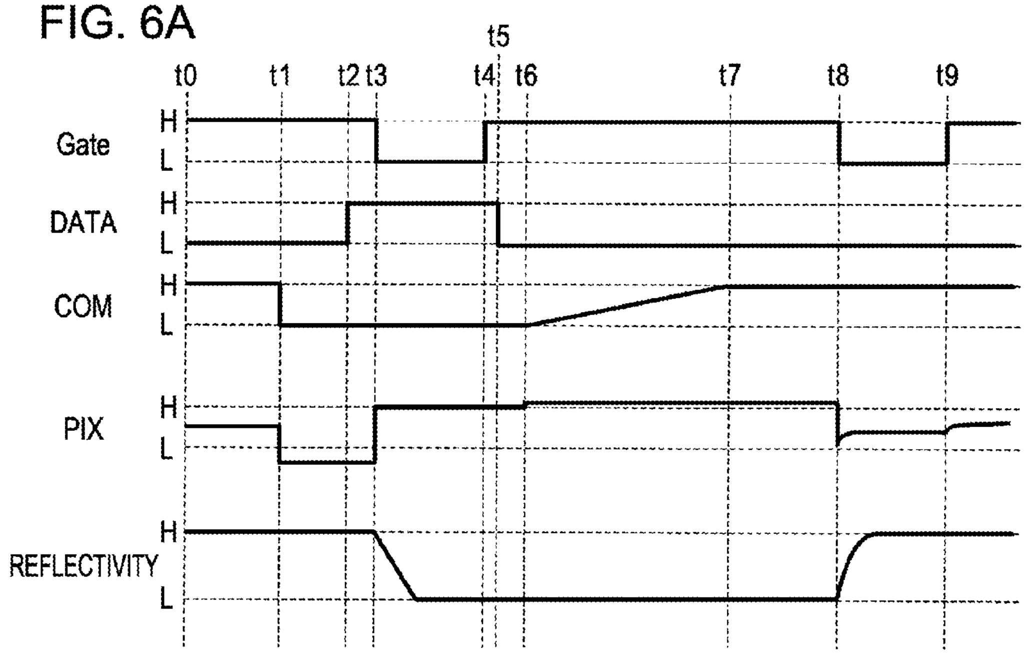
FIGS. 6A and 6B are explanatory views for an operation method according to a first embodiment.
Figure 6B:
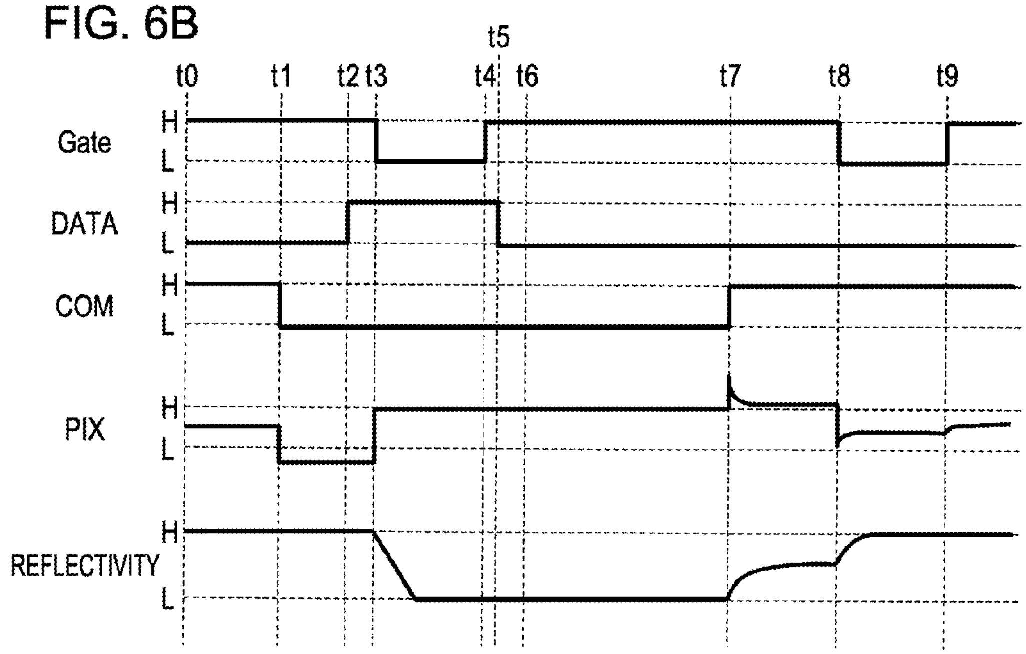

FIGS. 4A and 4B show circuit configurations of each pixel 40. FIG. 5 is a timing chart in the case where one of the pixels 40 displays black. FIGS. 6A and 6B are explanatory views for an operation method according to the first embodiment.

Referring to FIG. 4A, the selection transistor 41 is a P-channel transistor. The drain terminal of the selection transistor 41 is connected to the pixel electrode 35 via the insulation layer INS (wall membranes 20*a*, adhesive layer 33, and insulation film 34). Referring to FIG. 4B, the insulation layer INS is represented as a circuit including a parallel connection of a capacitance Cins and an electric resistance Rins. The electrophoretic device 32 is represented as a circuit including a parallel connection of a capacitance Cep and an electric resistance Rep.

FIG. 5 shows a potential Gate of the gate electrode 41*e* of the selection transistor 41 shown in FIG. 4A, a potential DATA of the source electrode 41*c* (data line 38) of the selection transistor 41, a potential COM of the common electrode 37, and the reflectivity of the display surface of the pixel 40.

An image is displayed in the display section 5 by inputting predetermined potentials to the pixel electrode 35 and the common electrode 37 of the pixel 40 in the image display area to thereby apply a driving voltage to the electrophoretic device 32 (microcapsules 20). At the starting time of an image displaying operation (time t0) in FIG. 5, the potential Gate of the gate electrode 41*e* of the selection transistor 41 is at a high level (H, for example, 40 V), the potential DATA of the source electrode 41*c* of the selection transistor 41 is at a low level (L, for example, 0 V, second potential), and the potential COM of the common electrode 37 is at a high level (H, for example, 40 V). At this time, the pixel 40 is in a state of high reflectivity (H) and displays white.

After the image displaying operation is started, the potential COM of the common electrode 37 is changed to a low level (L, for example, 0 V, second potential) at time t1. After that, at time t2, a rectangular-wave pulse is input to the data line 38 and the potential DATA of the source electrode 41*c* is changed to a high level (H, for example, 40 V, first potential).

Subsequently, the potential Gate of the gate electrode 41*e* of the selection transistor 41 is set at a low level (L, for example, 0 V) during the period from time t3 to time t4. This makes the selection transistor 41 to be in the on-state. That is, the potential DATA of the source electrode 41*c* is input to the pixel electrode 35 during the period from the time t3 to the time t4.

Specifically, during the period from the time t2 to time t5, the potential DATA is set at the high level and the potential DATA (high level, first potential) is input to the pixel electrode 35 via the selection transistor 41 in the on-state (device driving step S1). As a result, a voltage equivalent to the potential difference between the pixel electrode 35 (high level, first potential) and the common electrode 37 (low level, second potential) is applied to the electrophoretic device 32. This results in the state shown in FIG. 3B where the black particles 26 in the electrophoretic device 32 are attracted toward the common electrode 37. Thus, the image displaying operation is conducted.

After that, during the period from time t6 to time t7, the potential COM of the common electrode 37 is gradually changed at a constant gradient from the low level (second potential) to the high level (first potential) (potential recovering step S2). In this case, the gradient of the waveform of the potential COM is set in a range in which the voltage applied to the electrophoretic device 32 does not exceed the threshold voltage Vth of the electrophoretic device 32.

This gradient of the waveform of the potential COM will be described in further detail below.

According to the above-described operation method of the first embodiment, self-erasing of the electrophoretic device 32 can be suppressed and a displayed image can be maintained to have a good contrast. Hereinafter, these advantages will be described in detail.

FIGS. 6A and 6B are explanatory views for an operation method according to the invention. FIG. 6A shows waveforms applied to the pixel 40 when an operation method according to the first embodiment is performed. FIG. 6B shows waveforms provided when the operation is performed by inputting a rectangular wave (square wave) to the common electrode 37. FIGS. 6A and 6B show the potential Gate of the gate electrode 41*e*, the potential DATA of the source electrode 41*c*, the potential COM of the common electrode 37, a potential PIX of the pixel electrode 35, and the reflectivity.

Hereafter, FIGS. 6A and 6B are compared with each other. Referring to FIG. 6B, after an image is written to the electrophoretic device 32, a rectangular wave is input to the common electrode 37 to increase the potential COM. This results in generation of a spike in the potential PIX of the pixel electrode 35 and the potential PIX becomes larger than the high level. As a result, a large potential difference of 40 V or more is generated between the drain electrode 41*d* and the source electrode 41*c* of the selection transistor 41, which causes the selection transistor 41 to malfunction to be in the on-state. This causes generation of current flowing in the direction from the drain electrode 41*d* to the source electrode 41*c*. Thus, in the electrophoretic device 32, the white particles 27 are attracted toward the common electrode 37 while the black particles 26 are attracted toward the pixel electrode 35. As a result, the contrast of the electrophoretic device 32 supposed to display black is degraded.

Such backflowing of electrophoretic particles (white particles 27 and black particles 26) upon increasing the potential COM shown in FIG. 6B is caused by the following reason. In the electrophoretic display apparatus 100 including the insulation layer INS between the electrophoretic device 32 and the pixel electrode 35, Cins·Rins, which is the product of the capacitance Cins and the electric resistance Rins of the insulation layer INS, are generally made larger than Cep·Rep, which is the product of the capacitance Cep and the electric resistance Rep of the electrophoretic device 32, for the purpose of reducing leakage current. In such a configuration, the input of a rectangular wave to the common electrode 37 as shown in FIG. 6B causes differential potential change in the insulation layer INS and hence a large voltage appears at the instant when the potential COM is changed.

In contrast, according to an operation method of the first embodiment, when a trapezoidal wave is input to the common electrode 37 and the potential COM is increased at a gradient, the charge mobility in the capacitance Cins of the insulation layer INS is reduced and current flowing through the insulation layer INS is reduced. As a result, potential change in the insulation layer INS can be suppressed. Additionally, since current flowing through the insulation layer INS changes in accordance with the potential change rate of the common electrode 37, the range over which the potential changes in the insulation layer INS upon increasing the potential COM can be controlled by adjusting the gradient of the potential COM.

Specifically, the gradient of the potential COM is determined such that the range over which the potential changes in the insulation layer INS becomes smaller than the threshold voltage Vth of the electrophoretic device 32. As a result, as shown in FIG. 6A, alteration of the displaying state of the electrophoretic device 32 upon increasing the potential COM can be suppressed. Thus, as shown in FIG. 5, the reflectivity of the pixel 40 does not change even after the image has been written and the image is maintained to have a good contrast.

As described above, the probability of the occurrence of the self-erasing phenomenon of the electrophoretic device 32 is increased with an increase in the potential change rate for changing the potential COM and is decreased with a decrease in the potential change rate. Accordingly, the potential change rate upon increasing the potential COM in the first embodiment is preferably set to a value as large as possible in a range in which self-erasing does not occur. As a result, variation in the contrast due to self-erasing can be suppressed while the potential of the common electrode 37 can be stabilized in a short period of time. Thus, an excellent image retention characteristic can be achieved.

According to the operation method of JP-A-2003-140199, since a waveform is made to have a gradual decrease instead of a sharp drop upon decreasing the electrode potential, it takes a relatively long period of time for the potential to completely decrease. In contrast, since the potential COM is changed at a constant rate in the first embodiment, the time required for raising the potential COM of the common electrode 37 can be decreased while the advantages equivalent to those obtained by the operation method according to JP-A-2003-140199 are achieved.

In summary, according to the operation method of the first embodiment, the frequency of a pulse to be input to the common electrode 37 can be increased compared with existing operation methods and hence a voltage can be efficiently applied to the electrophoretic device 32.

Modification

In the first embodiment, the case where the selection transistor 41 is PMOS (Positive Metal Oxide Semiconductor) was described. When the selection transistor 41 is PMOS, after a black image is displayed, the potential DATA of the source electrode 41*c* is set at the low level. For this reason, a sharp increase in the potential PIX of the pixel electrode 35 upon increasing the potential COM of the common electrode 37 after the image displaying causes the selection transistor 41 to malfunction.

In contrast, when the selection transistor 41 is formed of NMOS, after a white image is displayed, the potential DATA of the source electrode 41*c* is set at the high level. For this reason, a sharp decrease in the potential PIX of the pixel electrode 35 upon decreasing the potential COM of the common electrode 37 after the image displaying has been performed causes the selection transistor 41 to malfunction. An operation method relating to such displaying of a white image will be described in the following modification.

Figure 7:
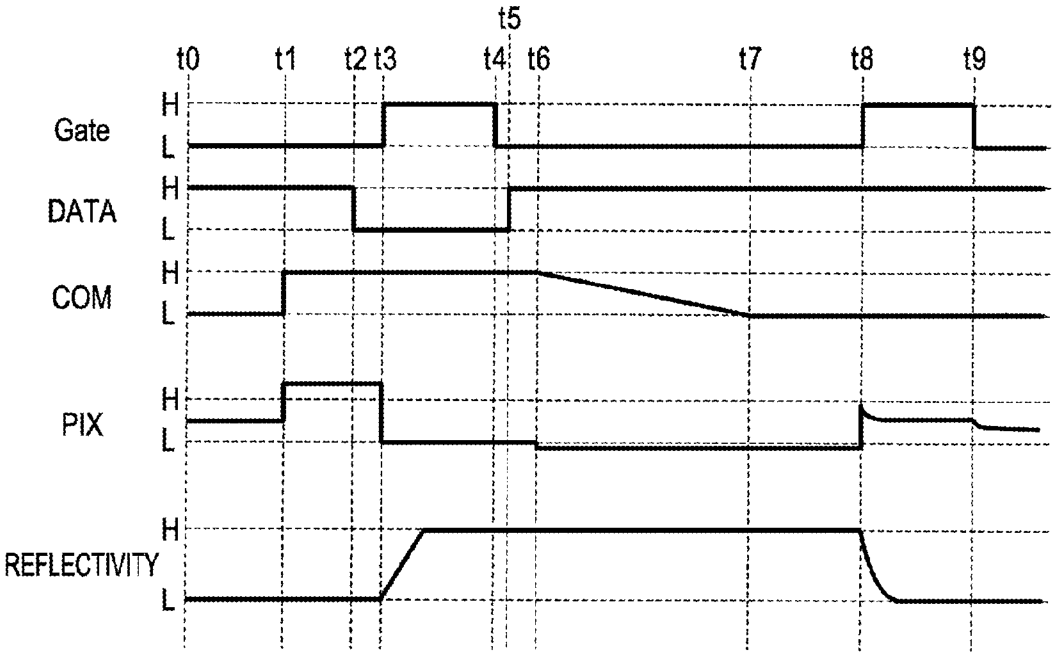
FIG. 7 is a timing chart showing an operation method according to a modification.

FIG. 7 is a timing chart used for describing a method for operating an electrophoretic display apparatus in which the selection transistor 41 is formed of NMOS.

FIG. 7 shows the potential Gate of the gate electrode 41*e* of the selection transistor 41, the potential DATA of the source electrode 41*c* of the selection transistor 41, the potential COM of the common electrode 37, the potential PIX of the pixel electrode 35, and the reflectivity of the display section 5.

The selection transistor 41 formed of NMOS is in the on-state while the gate electrode 41*e* is set at the high level. Thus, referring to FIG. 7, in a case where the pixel 40 is to display white, at time t0, the potential Gate of the gate electrode 41*e* is set to the low level, the potential DATA of the source electrode 41*c* is set to the high level, and the potential COM of the common electrode 37 is set to the low level. At the time t0, the pixel 40 is in a state of low reflectivity (L) and displays black.

After the image displaying operation is started, the potential COM of the common electrode 37 is changed to the high level at time t1, and subsequently the potential DATA of the source electrode 41*c* is changed to the low level at time t2.

Subsequently, the potential Gate of the gate electrode 41*e* is changed to the high level at time t3, which makes the selection transistor 41 to be in the on-state. The potential DATA of the source electrode 41*c* is then input to the pixel electrode 35 and the pixel electrode 35 is set at the low level. As a result, the potential difference between the pixel electrode 35 at the low level and the common electrode 37 at the high level drives the electrophoretic device 32 (device driving step S1). This increases the reflectivity of the pixel 40 and the pixel 40 starts to enter a state of high reflectivity (H) (displaying white).

Subsequently, at time t4, the potential Gate of the gate electrode 41*e* is changed to the high level. This makes the selection transistor 41 to be in the off-state and the image displaying operation in the pixel 40 is complete.

Subsequently, at time t5, the potential DATA of the source electrode 41*c* is changed from the low level (first potential) to the high level (second potential).

Subsequently, during the period from time t6 to time t7, the potential COM of the common electrode 37 is gradually changed at a constant rate from the high level (second potential) to the low level (first potential) (potential recovering step S2).

In this way, by inputting a trapezoidal wave to the common electrode 37 to decrease the potential COM at a gradient, the range over which the potential changes in the insulation layer INS can be decreased.

Specifically, the gradient of the potential COM is determined such that the range over which the potential changes in the insulation layer INS becomes smaller than the threshold voltage Vth of the electrophoretic device 32. As a result, generation of a spike that is a sharp drop in the potential PIX of the pixel electrode 35 is suppressed and alteration of the displaying state of the electrophoretic device 32 upon decreasing the potential COM can be suppressed. Thus, even after the image has been written, the pixel 40 is kept to be in the state of displaying white and the image is maintained to have a good contrast.

Second Embodiment

Hereinafter, a second embodiment according to the invention will be described.

Figure 8:
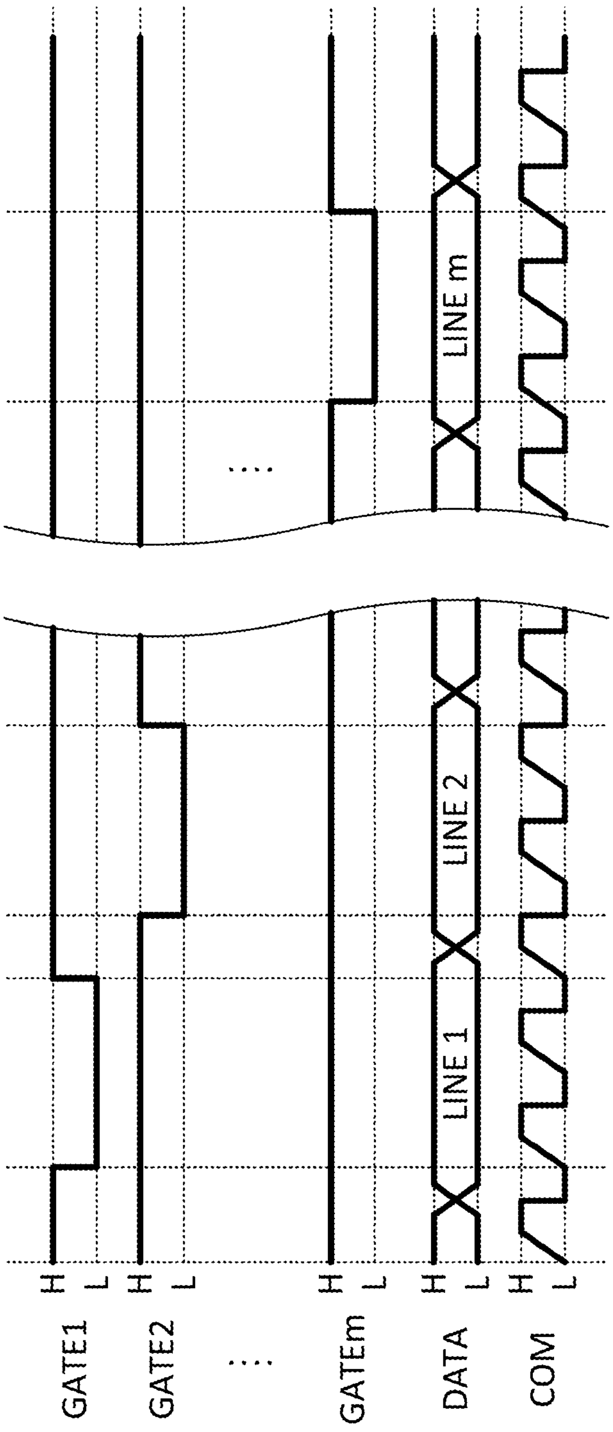
FIG. 8 is a timing chart showing an operation method according to a second embodiment.

FIG. 8 is a timing chart according to the second embodiment. FIG. 8 shows potentials GATE1 to GATEm of the gate electrodes 41*e* of the selection transistors 41 connected to the scanning lines 36 (G1 to Gm) shown in FIG. 1, a potential DATA of the source electrode 41*c*, and a potential COM of the common electrode 37.

Referring to FIG. 8, in the second embodiment, a voltage which alternates between a high level (first potential) and a low level (second potential) is input to the common electrode 37. The waveform of the voltage input to the common electrode 37 has trapezoidal shape. The potential of the common electrode 37 is gradually changed from the low level to the high level at a constant gradient such that a voltage applied to the electrophoretic device 32 does not exceed the threshold voltage Vth of the electrophoretic device 32. As in the second embodiment, image displaying by inputting, to the common electrode 37, a voltage which alternates between a high level and a low level is hereinafter referred to as "common oscillation driving".

While such an alternating voltage is input to the common electrode 37, the scanning line 36 (G1) is changed to the low level, so that the selection transistor 41 connected to the scanning line 36 (G1) is made to be in the on-state. As a result, the source electrode 41*c* and the drain electrode 41*d* are connected to each other and the potential is input from the source electrode 41*c* to the pixel electrode 35. Then, the scanning line 36 (G1) is changed to the high level, so that the selection transistor 41 is made to be in the off-state.

Such an operation is sequentially performed also for the other selection transistors 41 connected to the other scanning lines 36 (G2 to Gm). Thus, the potentials are input to all the pixel electrode 35.

In a pixel 40 in which the high-level potential is input to the pixel electrode 35, while the low-level potential is input to the common electrode 37, a potential difference is generated between the pixel electrode 35 and the common electrode 37. As a result, the black particles 26 are attracted toward the common electrode 37 and the white particles 27 are attracted toward the pixel electrode 35.

In contrast, while the high-level potential is input to the common electrode 37, a potential difference is not generated between the pixel electrode 35 and the common electrode 37. As a result, attractive force that attracts the black particles 26 and the white particles 27 toward the electrodes is not generated.

By repeating such an operation with the alternating voltage input to the common electrode 37, the black particles 26 are collected to the common electrode 37 and the white particles 27 are collected to the pixel electrode 35. Thus, the pixel 40 displays black.

In a pixel 40 in which the low-level potential is input to the pixel electrode 35, while the high-level potential is input to the common electrode 37, a potential difference is generated between the pixel electrode 35 and the common electrode 37. As a result, the white particles 27 are attracted toward the common electrode 37 and the black particles 26 are attracted toward the pixel electrode 35.

In contrast, while the low-level potential is input to the common electrode 37, a potential difference is not generated between the pixel electrode 35 and the common electrode 37. As a result, attractive force that attracts the black particles 26 and the white particles 27 toward the electrodes is not generated.

By repeating such an operation with the alternating voltage input to the common electrode 37, the white particles 27 are collected to the common electrode 37 and the black particles 26 are collected to the pixel electrode 35. Thus, the pixel 40 displays white.

In this way, by conducting the common oscillation driving, some pixels 40 display black while other pixels 40 display white.

In the second embodiment, the potential of the common electrode 37 is changed from the low level (second potential: L) to the high level (first potential: H) at a constant gradient (rate) such that the voltage applied to the electrophoretic device 32 is kept at the threshold voltage or less. Thus, potential change of the pixel electrode 35 upon the shift of the potential of the common electrode 37 to the high level can be suppressed.

Accordingly, even when an image is displayed by common oscillation driving, malfunction of the off-state selection transistor 41 of the pixel 40 not displaying the image due to the pixel electrode 35 having a potential higher than the high level can be suppressed. Therefore, self-erasing of a displayed image due to backflowing of electrophoretic particles having been collected to the electrodes can be suppressed and degradation of the contrast can be suppressed.

According to an operation method of the second embodiment, degradation of the contrast can also be suppressed even in pixels displaying black. Hereinafter, this advantage will be described.

Figure 9A:
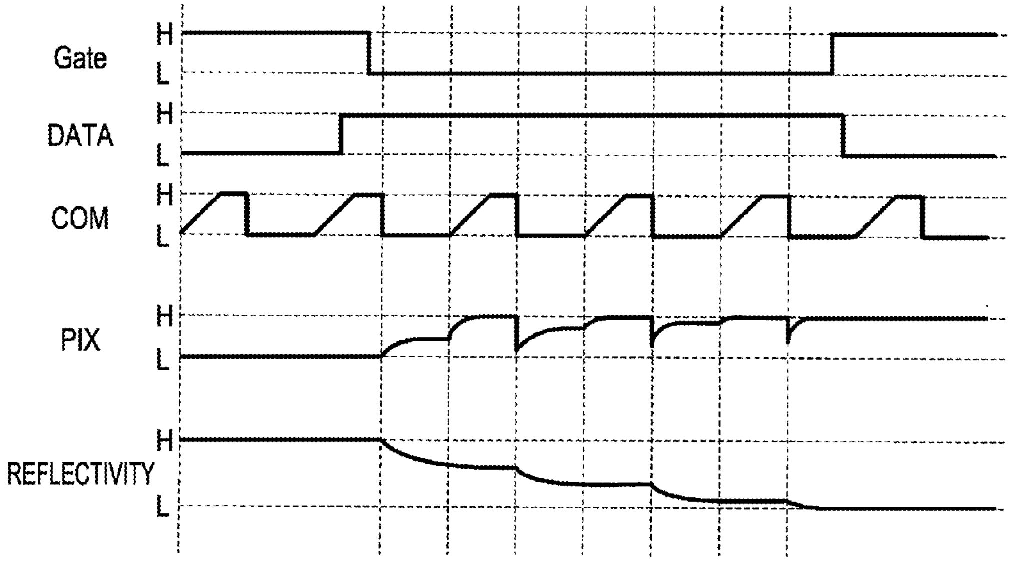
FIGS. 9A and 9B are explanatory views for an operation method according to a second embodiment.
Figure 9B:
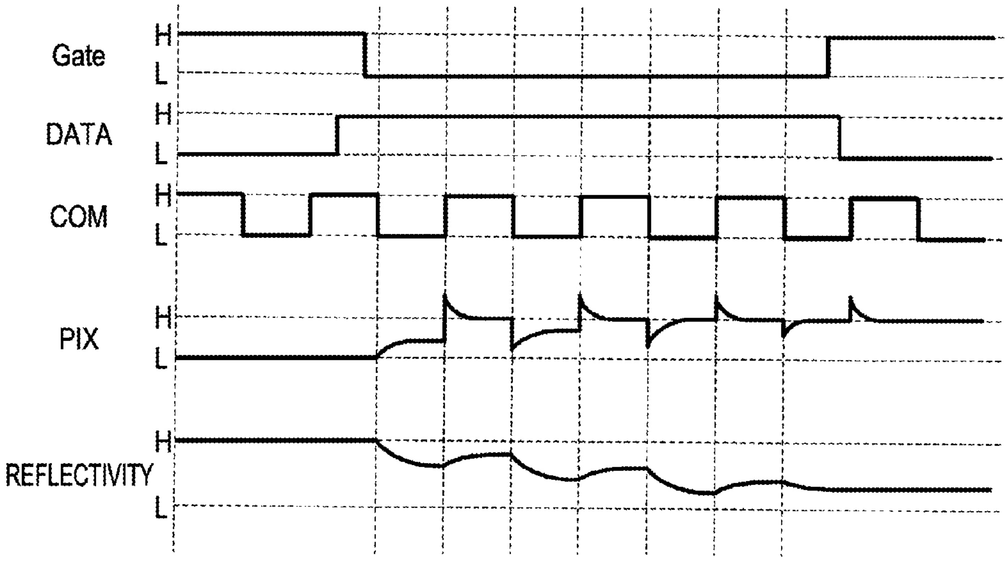

FIGS. 9A and 9B are explanatory views for an operation method according to the second embodiment. FIG. 9A shows waveforms applied to the pixel 40 when an operation method according to the second embodiment is performed. FIG. 9B shows waveforms provided when the operation is performed by periodically inputting a rectangular wave to the common electrode 37.

FIGS. 9A and 9B show the potential Gate of the gate electrode 41*e*, the potential DATA of the source electrode 41*c*, the potential COM of the common electrode 37, the potential PIX of the pixel electrode 35, and the reflectivity.

Referring to FIG. 9B, when the potential COM of the common electrode 37 is increased by inputting a rectangular wave, a spike is generated in the potential PIX of the pixel electrode 35 and the potential PIX temporarily increases to a potential higher than the high level and then maintains the potential at the high level. When the potential COM of the common electrode 37 is decreased, the potential PIX of the pixel electrode 35 temporarily decreases and then increases. While such a behavior is repeated, the potential PIX of the pixel electrode 35 gradually increases to the high level every time when a rectangular wave is input to the common electrode 37.

Simultaneously when a spike is generated in the potential PIX of the pixel electrode 35, electrophoretic particles in a pixel displaying black backflow, which increases the reflectivity of the pixel and the contrast of the displayed image is degraded. Such a phenomenon is referred to as kickback. Specifically, when such an operation method shown in FIG. 9B is used, in displaying black, the luminance gradually recovers (increases) every time when the potential COM of the common electrode 37 is increased. Accordingly, even when the potential Gate of the gate electrode 41*e* is returned to the high level and writing of an image is complete, the luminance is not sufficiently decreased and high contrast is not obtained.

Additionally, even after the potential Gate of the gate electrode 41*e* has been returned to the high level, a spike can be generated in the potential PIX of the pixel electrode 35 upon increasing the potential COM of the common electrode 37. When such a spike is generated and the potential PIX of the pixel electrode 35 exceeds the potential Gate of the gate electrode 41*e*, the selection transistor 41 may malfunction and an electric field in a direction in which the contrast is degraded may be generated.

In contrast, referring to FIG. 9A, according to the operation method of the second embodiment, trapezoidal waves are input to the common electrode 37 and the potential COM is increased at a gradient. Thus, generation of spikes in the potential PIX of the pixel electrode 35 is suppressed. As a result, backflowing of electrophoretic particles of pixels displaying black is suppressed and the occurrence of kickback is suppressed. Therefore, degradation of the contrast of a displayed image is suppressed and screen flickering during image displaying is prevented.

Electronic System

Hereinafter, the case where the electrophoretic display apparatus 100 of the above-described embodiment is applied to an electronic system is described.

Figure 10A:
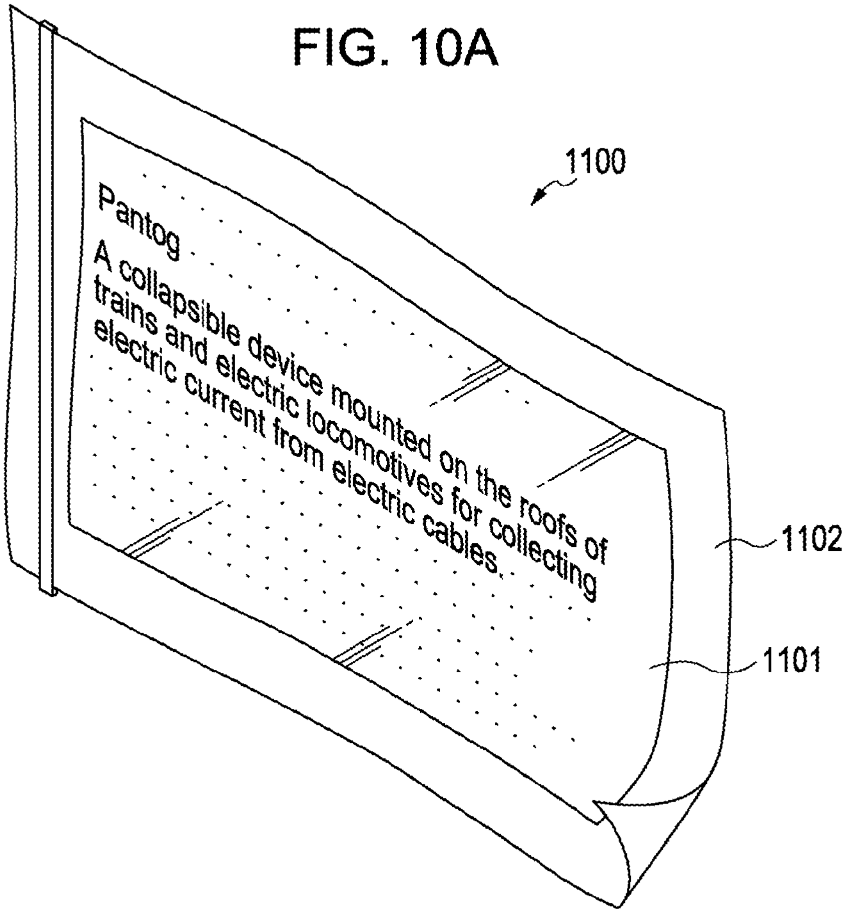
FIGS. 10A and 10B are perspective views showing examples of electronic systems.

FIG. 10A is a perspective view showing the configuration of an electronic paper 1100. The electronic paper 1100 includes the electrophoretic display apparatus 100 of the above-described embodiment in a display area 1101. The electronic paper 1100 also includes a body 1102 including a sheet that is bendable, has a texture and a flexibility similar to those of ordinary paper, and is rewritable.

Figure 10B:
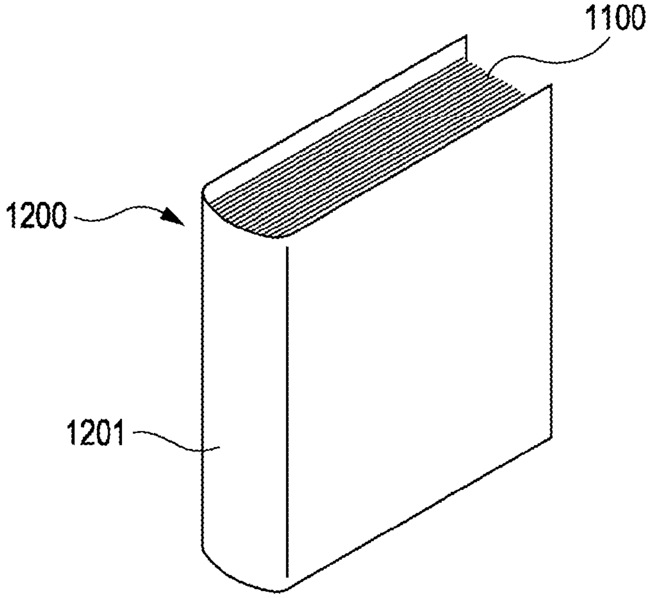

FIG. 10B is a perspective view showing the configuration of an electronic note 1200. The electronic note 1200 includes a stack of a plurality of the electronic papers 1100 and a cover 1201 sandwiching the stack therein. The cover 1201 includes a display data inputting unit (not shown) for inputting display data, for example, being fed by an external device. This unit allows changing or updating of the content being displayed in accordance with the display data in the state that the electronic papers are stacked.

The electronic paper 1100 and the electronic note 1200, which include the electrophoretic display apparatus 100 according to an embodiment of the invention, are electronic systems including a display unit having an excellent image retention characteristic and provides excellent displaying quality.

Note that the above-described electronic systems are mere examples of electronic systems according to embodiments of the invention and are not intended to restrict the technical scope of the invention. For example, an electrophoretic display apparatus according to an embodiment of the invention is also suitably applicable to the display units of electronic systems such as cellular phones or portable audio units.

The entire disclosure of Japanese Patent Application No. 2009-061178, filed Mar. 13, 2009 is expressly incorporated by reference herein.

What is claimed is:

1. A method for operating an electrophoretic display apparatus including a first substrate; a second substrate; an electrophoretic device being held between the first substrate and the second substrate and containing electrophoretic particles; a first electrode formed on a surface of the first substrate, the surface facing the electrophoretic device; an insulation layer formed between the first electrode and the electrophoretic device; and a common electrode formed on a surface of the second substrate, the surface facing the electrophoretic device, the method comprising:

(a) driving the electrophoretic device by inputting a first potential to the first electrode, (b) changing the potential of the common electrode, from the first potential to a second potential, and (c) recovering a potential of the common electrode by changing the potential of the common electrode, from the second potential to the first potential, at a constant rate such that the potential of the common electrode slopes along a constant gradient between the second potential and the first potential and such that a voltage applied to the electrophoretic device is made equal to or smaller than a threshold voltage of the electrophoretic device, wherein (b) and (c) are alternately performed a plurality of times during (a).

2. The method according to claim 1, wherein, in (c), the rate at which the potential of the common electrode is changed is set to a maximum value of a range within which the voltage applied to the electrophoretic device is made equal to or smaller than the threshold voltage of the electrophoretic device.

3. The method according to claim 1, wherein the electrophoretic device includes a capsule containing the electrophoretic particles and an electrophoretic dispersion solution, and the insulation layer includes a wall membrane of the capsule.

4. The method according to claim 3, wherein the insulation layer further includes an adhesive layer provided between the first electrode and the electrophoretic device.

5. A method for operating an electrophoretic display apparatus including a first substrate; a second substrate; an electrophoretic device being held between the first substrate and the second substrate and containing electrophoretic particles; a plurality of first electrodes formed on a surface of the first substrate, the surface facing the electrophoretic device; an insulation layer formed between the plurality of first electrodes and the electrophoretic device; and a common electrode formed on a surface of the second substrate so as to face the plurality of first electrodes, the surface facing the electrophoretic device, the method comprising:

driving a portion of the electrophoretic device between the at least one of the first electrodes and the common electrode by inputting a first potential to at least one of the first electrodes, and inputting a voltage alternating a plurality of times between the first potential and a second potential, to the common electrode during the driving of the portion of the electrophoretic device, a waveform of the voltage having trapezoidal shape, wherein a potential of the common electrode is changed a plurality of times during the driving of the portion of the electrophoretic device, from the first potential to the second potential, at a constant rate such that the potential of the common electrode slopes along a constant gradient between the second potential and the first potential and such that a voltage applied to the electrophoretic device is made equal to or smaller than a threshold voltage of the electrophoretic device.

6. The method according to claim 5, wherein the electrophoretic device includes a capsule containing the electrophoretic particles and an electrophoretic dispersion solution, and the insulation layer includes a wall membrane of the capsule.

7. The method according to claim 6, wherein the insulation layer further includes an adhesive layer provided between the first electrode and the electrophoretic device.

8. An electrophoretic display apparatus comprising:

a first substrate;

a second substrate;

an electrophoretic device disposed between the first substrate and the second substrate and containing electrophoretic particles;

a first electrode disposed on a surface of the first substrate, the surface facing the electrophoretic device;

an insulation layer disposed between the first electrode and the electrophoretic device;

a common electrode disposed on a surface of the second substrate, the surface facing the electrophoretic device; and a voltage control section that applies a driving voltage to the electrophoretic device, wherein, in driving the electrophoretic device to display images, the voltage control section is configured to drive the electrophoretic device by inputting a first potential to the first electrode, the voltage control section is configured to perform a potential changing operation in which the potential of the common electrode is changed from the first potential to a second potential, and the voltage control section is configured to perform a potential recovering operation in which a potential of the common electrode is changed, from the second potential to the first potential, at a constant rate such that the potential of the common electrode slopes along a constant gradient between the second potential and the first potential and such that a voltage applied to the electrophoretic device is made equal to or smaller than a threshold voltage of the electrophoretic device, and wherein the voltage control section is configured to alternately perform the potential changing operation and the potential recovering operation a plurality of times while the voltage control section inputs the first potential to the first electrode.

9. The electrophoretic display apparatus according to claim 8, wherein the electrophoretic device includes a capsule containing the electrophoretic particles and an electrophoretic dispersion solution, and the insulation layer includes a wall membrane of the capsule.

10. The electrophoretic display apparatus according to claim 8, wherein the insulation layer includes an adhesive layer provided between the first electrode and the electrophoretic device.

11. An electronic system comprising the electrophoretic display apparatus according to claim 8.

12. The method according to claim 1, wherein the first electrode comprises a pixel electrode.

13. The method according to claim 1, wherein:

the first potential is input to the first electrode via a transistor, wherein the transistor is in an off-state following (a).

* * * * *